United States Patent [19]
Savoca

[11] Patent Number: 5,399,862
[45] Date of Patent: Mar. 21, 1995

[54] METHOD FOR REDUCING RADIANCE ERRORS IN EARTH SENSORS

[75] Inventor: Robert C. Savoca, Ridgefield, Conn.

[73] Assignee: EDO Corporation, Barnes Engineering Division, Shelton, Conn.

[21] Appl. No.: 63,149

[22] Filed: May 18, 1993

[51] Int. Cl.$^6$ .............................................. G01J 5/10
[52] U.S. Cl. ...................................... 250/349; 250/342
[58] Field of Search ........................ 250/349, 342, 347

[56] References Cited

U.S. PATENT DOCUMENTS

| | | | |
|---|---|---|---|
| 3,486,024 | 12/1969 | Astheimer | 250/338.1 |
| 4,785,169 | 11/1988 | Gontin | 250/342 |
| 5,079,419 | 1/1992 | Falbel | 250/342 |

*Primary Examiner*—Carolyn E. Fields
*Attorney, Agent, or Firm*—Parmelee, Bollinger & Bramblett

[57] ABSTRACT

A horizon sensor orbiting the earth views the earth's horizon in at least two points in the earth's summer and winter hemisphere and calculates pitch and roll information therefrom. The summer pitch and roll information is calculated at intervals long with respect to pitch and roll rates, but short with respect to weather variation. The pitch and roll information is then periodically corrected during a predetermined correction interval using the summer hemisphere pitch and roll information.

3 Claims, 2 Drawing Sheets

FIG. I

METHOD FOR REDUCING RADIANCE ERRORS IN EARTH SENSORS

BACKGROUND OF THE INVENTION

Horizon sensors are used on orbiting bodies such as spacecraft and satellites to provide attitude information with respect to two orthogonal axes representing pitch and roll. The sensors may provide for scanning across the disk of the earth to provide at least two horizon crossings or points of optical radiation discontinuity which are viewed by a detector, e.g., infrared detector mounted in the sensor. To avoid scanning, a radiation balance type sensor has been used in which detectors in the sensor view radiation from areas extending across the horizon at several points which are then employed in an algorithm to compute pitch and roll. In the past, the assumption of the earth radiance model in the $CO^2$ band has been a north south seasonal radiance variation. Note the performance of both scanning and starring, static earth sensors are affected by radiance variation at the earth's limb.

A typical earth sensor operating at geosynchronous altitude might have four fields viewing the horizon at different points, such as A, B, C & D in FIG. 1. The shaded area of each of these rectangular fields is the portion receiving earth radiation and producing output signals $V_A$, $V_B$, $V_C$ & $V_D$. The roll axis of the spacecraft is assumed parallel to the equator and the pitch axis parallel to the polar axis. If the earth radiance is uniform, pitch and roll can be derived simply as follows:

Pitch $P = V_A - V_B = V_C - V_D$

Roll $R = V_A - V_C = V_B - V_D$

The two independent values obtained for both pitch and roll can be averaged to reduce any error by $1/\sqrt{2}$.

In actuality, there are large variations in radiance with latitude and season. To correct for this, compensation detectors $A_o$, $B_o$, $C_o$ & $D_o$ are frequently added as shown in FIG. 1. These detectors measure the radiance in the vicinity of the position sensing detectors and apply a correction to each, in accordance with U.S. Pat. No. 3,486,024. However, this assumes that the radiance is uniform over the "position sensing" and "compensation" detectors. This is not so in the winter hemisphere where significant longitudinal radiance variations occur caused by storms, extra tropical cyclones, and frontal systems. These produce radiance differences between the position sensing field and its compensation field and can cause substantial pitch and roll errors.

SUMMARY OF THE INVENTION

Accordingly, it is an object of the present invention to reduce the pitch and roll error due to radiance variation.

Another object of this invention is to produce more accurate pitch and roll attitude information by reducing the effects of radiance errors in earth sensors.

In carrying out this invention in one illustrative embodiment thereof, a method is provided for reducing pitch and roll errors due to radiance variation by viewing the earth's horizon from an orbiting satellite or body in at least two points in each hemisphere, calculating first pitch and roll information from said at least two points in each hemisphere, calculating summer hemispheric pitch and roll information, and periodically correcting said first pitch and roll information during predetermined correction intervals using said summer pitch and roll information, whereby any radiance error is limited to that which takes place during said predetermined correction intervals rather than the total error normally accumulated from all four points of optical radiation discontinuity.

BRIEF DESCRIPTION OF THE DRAWINGS

The invention together with further advantages, objects, aspects and features thereof may be more clearly understood from the following description taken in connection with the accompanying drawings.

DESCRIPTION OF THE PREFERRED EMBODIMENTS

Small scale, weather induced, radiance variations only change slowly over many hours or even days. At geosynchronous altitude, the same side of the earth is viewed continuously and the error caused by such variations will have the same temporal characteristics as the local weather, i.e., periods of many hours or days. True pitch and roll motions of the satellite will be much faster with periods of seconds or minutes. This enables them to be separated by their frequency characteristics.

Since the altitude is known, pitch and roll can be obtained from two detectors only since two points determine the location of a circle of known radius. For example, suppose it is winter in the northern hemisphere. Pitch and roll are computed using all four fields in the manner described previously. At intervals, long with respect to pitch and roll rates but short with respect to weather variations, pitch and roll are calculated from detectors C and D only, in the summer hemisphere. These values will be called $P_s$ and $R_s$. Also, the normally computed values of pitch and roll at this instant are referred to as $P_1$ and $R_1$. The values $(P_1-P_s)$ and $(R_1-R_s)$ are stored and subtracted from all subsequent values of pitch and roll, until updated at the next interval. Thus:

Pitch $= P - (P_1 - P_s)$

Roll $= R - (R_1 - R_s)$

Figure 1:
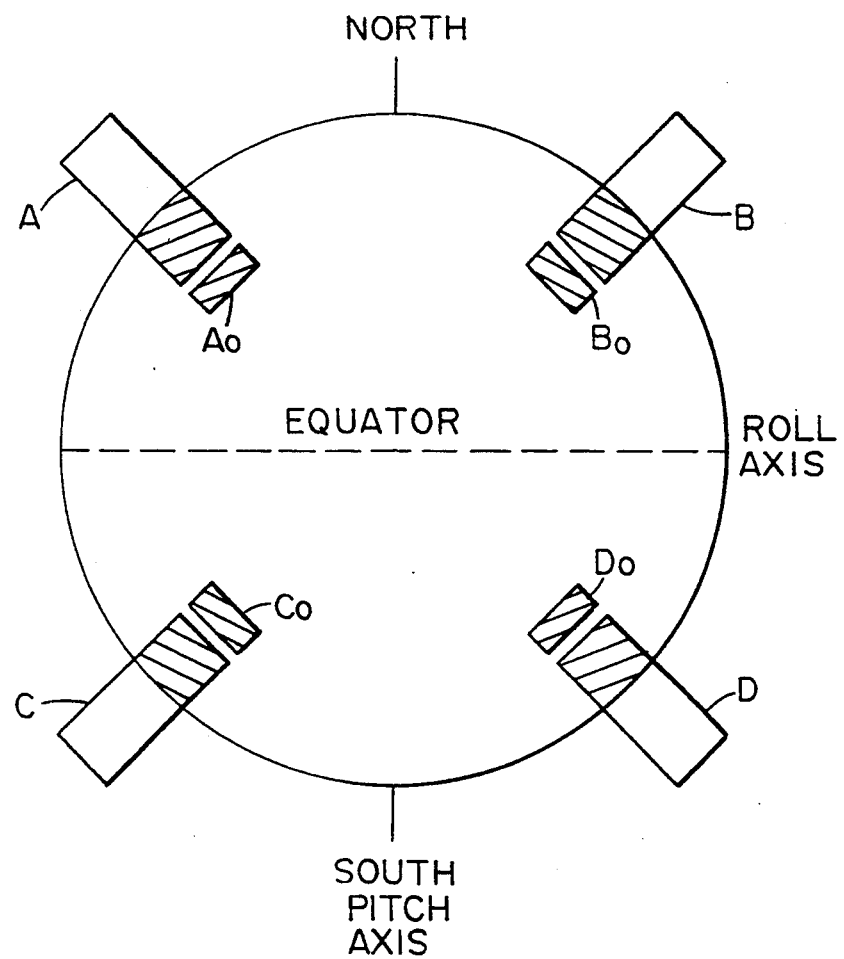
FIG. 1 is a diagrammatic plan view of the earth's horizon showing detector fields of view.
Figure 2:
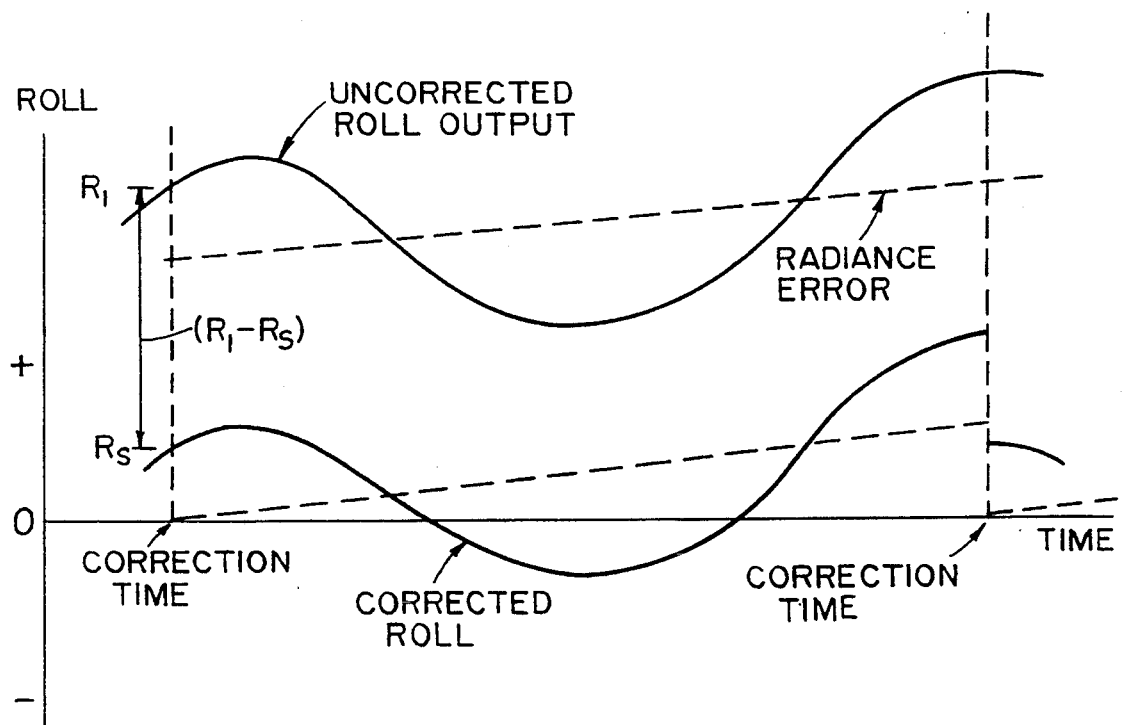
FIG. 2 is a graph illustrating radiance correction in accordance with the present invention with respect to horizon sensor roll output.

These correction intervals would be of the order of 5 minutes. At the correction time, pitch and roll outputs will be exactly $P_s$ and $R_s$. However, during the 5 minutes to the next correction, an averaging advantage is gained of all four fields, and are only subject to the change in the radiance variation error that takes place over the interval rather than the total error. This is illustrated in FIG. 2 with respect to roll error and would provide a similar result for pitch error.

The subtractive update method outlined above or a recursive update method may be used.

In the Recursive Correction Procedure:
Suppose $P_{summer} = P_S = P_{AB} =$ Pitch Calculated From Fields A & B $P_{winter} = P_W$; $P_{CD} =$ Pitch Calculated From Fields C & D $P_{COR} =$ Correction Term Then at the nth epoch (or data frame):

$$P_S[n] = P_{AB}[n]$$

$$P_W[n] = P_{CD}[n] + P_{COR}[n]$$

$$PITCH[n] = \tfrac{1}{2}(P_S[n] + P_W[n])$$

The correction to be used at the (n+1)th epoch is given by $$P_{COR}[n+1] = fP_{COR}[n] + (1-f)(P_S[n] - P_W[n])$$

A value f=0.998 gives A 5 minute time constant for ½ second frame rates.

The starting value of $P_{COR}$ could always=0, or it could be set to $P_S - P_{CD}$ at the start.

Roll would be similar.

Both updating corrective methods use the summer hemisphere pitch and roll update to average the radiance errors over a predetermined interval of time. The corrections in the recursive method would generally be more frequent.

Figure 3:
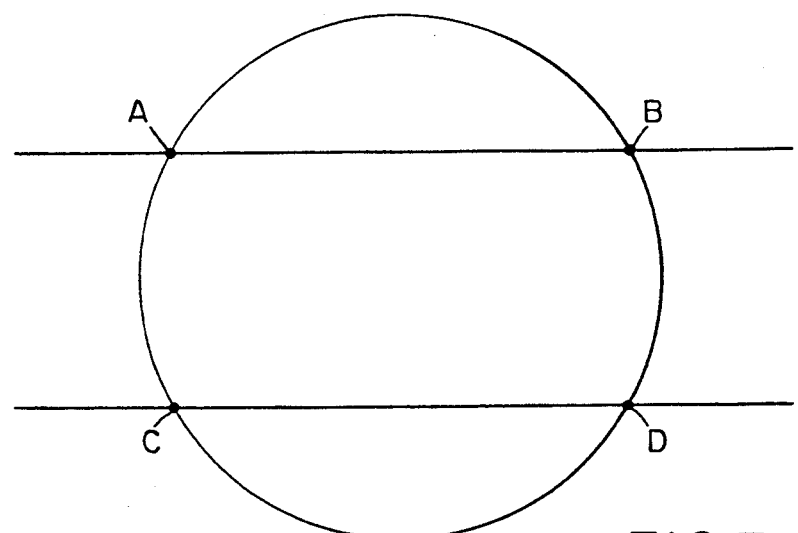
FIG. 3 is a diagrammatic plan view of the earth's disk showing alternate scan lines for identifying four points used in radiance correction with respect to a scanning sensor.

The principle of the correction method has been explained using a 4-field static sensor, but can be applied to any type of system which has redundancy in the two hemispheres. For example, the correction could be applied to a scanning system which alternately or simultaneously scans two lines across the earth as shown in FIG. 3. This identifies the four points A, B, C and D.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention, as claimed in the following claims and equivalents thereto.

I claim:

1. A method for reducing radiance errors in determining the orientation of a body orbiting the earth having a horizon sensor mounted thereon to provide pitch and roll attitude information by viewing the discontinuity of optical radiation occurring at the earth horizon between the earth and outer space comprising the steps of:

viewing the earth's horizon in at least two points in each of the earth's summer and winter hemispheres and sensing the optical radiation discontinuity at said points, calculating first pitch and roll information from said points in said summer and winter hemispheres, calculating summer hemisphere pitch and roll information using only said at least two points in said earth's summer hemisphere at intervals long with respect to pitch and roll rates but short with respect to weather variations, periodically correcting said first pitch and roll information during predetermined correction intervals using said summer hemisphere pitch and roll information whereby any radiance error is limited to that which takes place during said predetermined correction intervals rather than the total error accumulated between calculations from at least four points of optical radiation discontinuity in the absence of the periodic corrections made during said correction intervals.

2. The method as claimed in claim 1 wherein the steps of viewing said earth's horizon are performed by four optical radiation detectors viewing the horizon at said points.

3. The method as claimed in claim 1 wherein the steps of viewing said earth's horizon at four different points is provided by scanning two lines across the earth, one line in each hemisphere, for identifying said four points.

* * * * *